Jan. 5, 1932.   J. R. CAMERON   1,839,196
AUTOMATIC MACHINE FOR FORMING IRONING BOARDS AND THE LIKE
Filed Oct. 28, 1929   3 Sheets-Sheet 2

Inventor
James R. Cameron
by Hazard and Miller
Attorneys

Jan. 5, 1932.   J. R. CAMERON   1,839,196
AUTOMATIC MACHINE FOR FORMING IRONING BOARDS AND THE LIKE
Filed Oct. 28, 1929   3 Sheets-Sheet 3
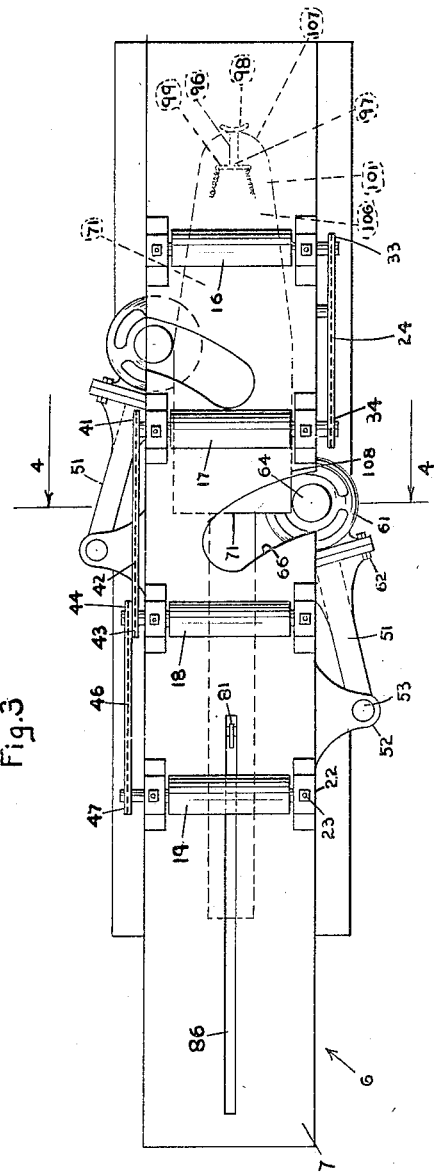
Inventor
James R. Cameron
by Hazard and Miller
Attorneys Patented Jan. 5, 1932

1,839,196

UNITED STATES PATENT OFFICE

JAMES R. CAMERON, OF LOS ANGELES, CALIFORNIA, ASSIGNOR TO CALIFORNIA SASH, DOOR & MILL CO., LTD., OF LOS ANGELES, CALIFORNIA, A CORPORATION OF CALIFORNIA

AUTOMATIC MACHINE FOR FORMING IRONING BOARDS AND THE LIKE

Application filed October 28, 1929. Serial No. 403,014.

This invention relates to woodworking machinery, and has for an object the provision of a woodworking machine capable of automatically shaping pieces of wood so as to produce articles of peculiar configuration.

Another object is the provision of a woodworking machine as described, in which the shaping of the ultimate article is determined accurately by means of a suitable template.

A further object is the provision of a machine for accurately shaping wood into articles of predetermined configuration, which is of a relatively simple nature and composed of relatively few and inexpensive parts, which is capable of operating with a high degree of efficiency, and with extreme rapidity.

Another object is the provision of a wood-shaping machine of the general character described, with which interchangeable templates may be employed, thus permitting the manufacture of a variety of differently shaped articles and several different sizes of each shape.

A more detailed object is the provision of a wood-shaping machine as described, which is particularly adapted for the rapid and economical manufacture of ironing-boards.

The invention possesses other objects and advantageous features, some of which, with those enumerated, will be set forth in the following description of the invention's particular embodiment which is illustrated in the drawings accompanying and forming a part of the specification.

Referring to the drawings:

Fig. 3 is a top plan view.

Fig. 4 is a transverse, vertical sectional view taken upon the line 4—4 of Fig. 3, with the direction of view as indicated.

Figure 1:
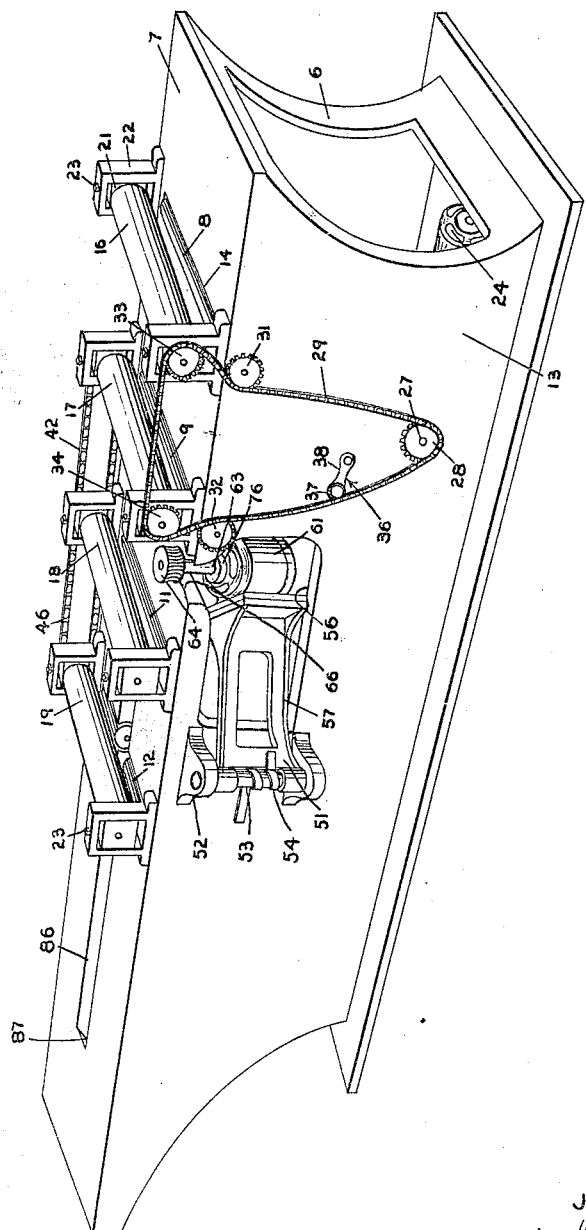
Figure 1 is a perspective view of a woodworking machine embodying the principles of the present invention.
Figure 2:
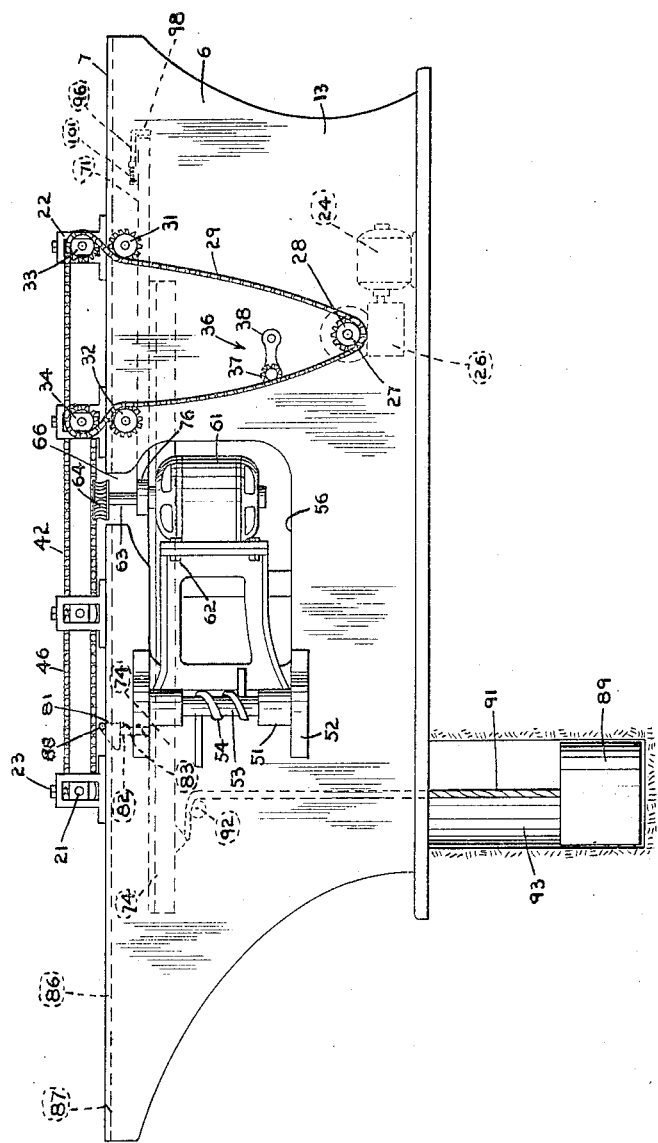
Fig. 2 is a side elevation with a portion of the supporting structure of the machine shown in vertical section to better disclose a portion of the invention.

Specifically describing the invention in one of its embodiments, the woodworking machine of the present invention, comprises a frame 6 of suitable design and having a flat, level top 7. The top 7 of the frame 6, is of such configuration and dimensions that it is adapted to support the raw stock from which the articles being manufactured, are to be cut during advance of the stock thereacross, until it arrives at the opposite end of the top 7 in finished form. Means for advancing the work longitudinally of the top 7 are provided, preferably in the form of a plurality of rollers 8, 9, 11, and 12, which are journalled in the opposed sides 13 of the frame 6, and each of which extends through a suitable slot 14 in the top 7, to a position slightly above the plane of the upper surface thereof. The rolls 8 to 12 inclusive, are journalled for rotation about fixed axes, whereas cooperative rollers 16, 17, 18, and 19 are journalled for rotation about movable axes above the rolls 8 to 12 respectively. The adjustable rolls 16 to 19 inclusive, are journalled in suitable bearing blocks 21, each of which is slidably retained within a vertically extending frame 22 rigid with the top 7 of the frame 6. An adjusting bolt 23 extends loosely through a clearance hole in the top of each of the frames 22, and is threaded into the associated bearing block 21. The bolts 23 are of such length that the heads thereof engage the tops of their respective frames 22 when the vertically adjustable rolls 16 to 19 inclusive, are spaced above the non-adjustable rolls 8 to 12 inclusive, a distance slightly less than the thickness of the raw stock to be handled by the machine. However, inasmuch as the bolts 23 extend through the clearance holes in the top of the frame 22, when stock is forced between the associated pairs of rolls the vertically adjustable rolls will be forced upwards to permit the stock to pass therebetween.

An advancing motor 24 is positioned in the bottom of the frame 6, and is connected by means of a reduction gearing 26 to a shaft 27 which extends through the adjacent side 13 of the frame 6, and has a sprocket wheel 28 secured to its extended end. This sprocket wheel 28 is adapted to drive a chain 29 which is also engaged upon sprocket wheels 31, 32, 33, and 34, which are rigid with the rolls 8, 9, 16, and 17 respectively, the chain 29 being so engaged with these rolls that they are driven in the proper direction to cause a plank or similar raw stock engaged therebetween, to be advanced longitudinally of the machine. Inasmuch as the vertical movement of the upper rolls 16 and 17 will vary the tension of the chain 29, a spring-pressed idler mechanism 36 is employed, this mechanism including an idler sprocket 37 enmeshed with the chain 29 and carried at the outer end of a pivotally mounted arm 38 which is pressed by a spring (not shown) so as to continually exert pressure against the chain 29 and take up any slack therein. The roll 17 carries a second sprocket 41 on the end thereof opposite the sprocket 34, to accommodate a chain 42 which is also enmeshed upon a sprocket 43 carried by the roll 18. A second sprocket 44 has another chain 46 enmeshed thereupon, which is also engaged upon a sprocket 47 rigid with the roll 19; with the result that a single driving motor 24 is capable of imparting suitable rotational energy to the rolls 8, 9, 16, 17, 18, and 19, as will be readily understood. From this construction it is apparent that if a board is placed upon the inlet end of the top 7, and one end of the plank engaged between the rolls 8 and 16 while the motor 24 is energized, the board will be advanced because of its engagement with the rolls longitudinally along the top 7. As the plank advances, it will successively engage the associated pairs of rolls so that it will be advanced to the other end of the frame 6 before released by the last pair of rolls 12 and 19.

A cutter supporting bracket 51 is pivotally mounted upon each side 13 of the frame 6, for movement about vertical axes. Any suitable means for mounting the brackets 51 may be employed, such as a pair of spaced bosses 52 rigid with the associated side 13 and supporting an axial pin 53 therebetween, upon which the inner end of the associated bracket 51 is journalled. A relatively heavy spring 54 encircles each of the pins 53, and is so arranged that it continually urges the associated bracket 51 inwards in respect to the line of travel of a board upon the top 7 of the frame 6. An aperture 56 is formed in each of the sides 13 slightly in advance of the associated bosses 52, so as to permit the associated bracket 51 to extend therethrough to a position under the longitudinal, central axis of the top 7.

Each of the brackets 51 carries a motor 61 which is rigidly and preferably removably mounted thereupon by means of a purality of bolts 62 or their equivalent. Each motor 61 is mounted in such position that its shaft 63 is disposed vertically so as to position a cutter head 64 rigid with the upper end of the shaft 63 and above the plane of the top 7, i. e., in the path of travel of a board in advancing across the top 7. For this purpose an arcuate slot 66 extends inward from each of the apertures 56, the curvature of each slot 66 being of radius drawn from the axis of the associated pin 53, so as to permit the associated bracket 51 to swing unrestrictedly to vary the positioning of the cutter 64 in respect to the line of travel of a board through the machine.

A template 71 is mounted on the frame 6 for movement in parallelism with the line of travel of a board across the top 7. For this purpose a track 72 is rigidly mounted below the top 7 of the frame 6, by means of suitable brackets 73; and a guide 74 is slidably mounted upon the track 72 for movement longitudinally of the frame. The template 71 is removably attachable to the guide 74, by any suitable means (not shown).

A roller 76 is carried by each of the cutter brackets 51, and journalled preferably upon the housing of the associated motor 61, for rotation about an axis coincident with that of the shaft 63. Each of the rollers 76 is so positioned that it lies in the plane of the template 71, and preferably each roller 76 corresponds in diameter to the associated cutter head 64.

Means are provided for advancing the template 71 along the track 72, this means being so designed that the advance of the template 71 is effected by engagement with a board 77 being advanced along the top 7; with the result that advance of the template 71 at the same rate as the advance of the board 77, is assured. The guide 74 extends considerably farther toward the rear of the frame 6 than the template 71 secured thereto; and a detent 81 is mounted for vertical movement adjacent the extreme after end of the guide 74. The detent 81 is mounted upon a suitable pin 82 about which a coil spring 83 is positioned, this spring 83 being under compression between the bottom of the detent 81 and the top of the guide 74 in which the pin 82 is slidably disposed; with the result that the spring 83 is continually urging the detent 81 toward its upper extreme of movement. An elongated slot 86 extends longitudinally of the top 7 from substantially a point midway between the ends thereof, toward the after end. When in its upper extreme of movement, the detent 81 extends through this slot 86 into the line of travel of the board 77. The after edge of the detent 81 is inclined; and an inclined cam surface 87 defines the after end of the slot 86, the parts being so proportioned and arranged that when the guide 74 and template 71 reach the end of their stroke toward the rear of the machine, the sloping edge of the detent 81 will engage the sloping cam surface 87; with the result that the detent 81 is pressed downwards against the action of the spring 83 until it is disposed entirely below the plane of the upper surface of the top 7. This will permit the board to pass the detent 81 with a roller 88 carried by the detent 81 engaging the under side of the board as the board moves thereover.

A weight 89 is connected by means of a flexible cable 91 to the after end of the guide 74, the cable 91 extending forward from its point of attachment to the guide 74 and passing over a sheave 92, so that the weight 89 continually urges the guide 74 and template 71 toward the forward end of the machine. In order that the template 71 and guide 74 may have sufficient stroke, a pit 93 may be formed below the frame 6, into which the weight 89 may drop when the template and guide are in their forward extreme of movement.

The mounting of the bracket 57 and the extent of the slots 66 are such that the brackets 51 may swing inwards far enough to position the axes of the respective shafts 63 closely adjacent but not quite in the center line of the template 71. Consequently, it is deemed advisable to provide means for preventing jambing of the machine which might occur if the forward end of the template 71 were to come into contact with the roller 76 during the return stroke of the template 71. For this purpose an arm 96 is pivoted as by a pin 97 adjacent the forward end of the template 71, and carries an arcuate socket member 98 at its outer end, the curvature of the socket member 98 being of radius somewhat greater than that of the roller 76. A lever 99 extends transversely of, and on both sides of the arm 96; and a coil spring 101 is under tension between each outer end of the lever 99 and an adjacent portion of the template 71, these springs serving to retain the arm 96 extending longitudinally in respect to the major axis of the machine, i. e., in parallelism with the line of travel of the template 71. The parts are so arranged that after the template 71 has passed beyond either one of the rollers 76, and the associated spring 54 has swung the roller 76 in back of the template 71, the springs 101 will yieldably dispose the socket member 98 in such position that as the template 71 returns, the roller 76 will be seated within the socket 98. However, owing to the fact that the associated bracket 51 has not been able to swing quite to the center line of the template 71, continued reverse movement of the template 71 will cause the arm 96 to be swung toward that side of the frame 6 upon which the associated bracket 51 is mounted, and thus start that bracket in its outward movement, preventing any possibility of the roller 76 becoming engaged upon the end of the template in such a manner as to jamb the machine.

As best shown upon Fig. 3, the two brackets 51 are not disposed in diametrically opposite positions upon the frame 6. Instead, one is somewhat in advance of the other; with the result that both brackets can be swung to their extreme innermost positions without interference with each other.

Whereas the machine is designed to form flat articles of practically any desired configuration, the machine of the present embodiment is particularly useful in rapidly and economically manufacturing ironing boards. For this purpose the template 71 employed, is so constructed that it tapers from a point substantially midway between its ends, toward its forward end 106 which is rounded as indicated at 107, whereas the after end 108 is formed square. Furthermore, ironing boards of any desired length may be formed by utilizing a template 71 of the desired dimensions, the only limitation being that the template 71 shall not be short enough to permit disengagement of its after end 108 from either of the rollers 76 when the template 71 is in its forward extreme of movement, unless some means be provided for preventing the brackets 51 from swinging inwards as a result of such disengagement.

The process of constructing ironing boards by means of my improved woodworking machine, is substantially as follows:

After the suitable template 71 has been rigidly secured upon the guide 74 and the motors 24 and 61 energized, a board of suitable thickness is placed upon the forward end of the frame 6 and engaged between the first pair of rollers 8 and 16. The board will then be engaged by these rolls and advanced longitudinally along the top 7, so that it is soon engaged by the rolls 9 and 17. As the advance of the board continues, the edges thereof will be engaged by the cutter heads 64, the teeth of which are preferably concave so as to cut the edges of the board to rounded configuration.

The spacing of the innermost portion of the rotor heads 64, is determined by the engagement of the rollers 76 with the edges of the template 71; and inasmuch as the rollers 76 and cutter heads 64 are preferably of the same diameter, the board 77 will be cut to the same width as that of the template 71. When the leading end of the board 77 encounters the detent 81, it will cause the template 71 to be slid upon the track 72 toward the rear of the machine, at the same speed as that of the board 77. Consequently, as the tapered portion of the template 71 comes into register with the rollers 76, the springs 54 will press the brackets 51 inwards, permitting the cutter heads 64 to remove more of the material from the board 77; with the result that the trailing end of the board 77, is shaped to conform to the configuration of the tapered portion 106 of the template 71. Obviously, the length of the board 77 is determined by the position of the detent 81 with respect to the template 71; with the result that the template 71 does not necessarily have to be the length of the ironing boards formed therewith.

As the template 71 approaches its after extreme of movement, i. e., after both cutters 64 have moved to their extreme innermost positions, the inclined edge of the detent 81 will engage the cam surface 87, causing the detent 81 to be pressed downwards as described hereinabove. This will permit the detent 81 to become disengaged from the leading end of the board, whereupon the weight 89 will pull the template 71 back to starting position with the roller 88 traveling along in contact with the under surface of the board. Obviously, when the trailing end of the board 77 has been passed by the roller 88, the spring 83 will press the detent 81 upwards again, through the slot 86 in position to be engaged by the next board.

After the template 71 commences its return stroke, first one and then the other of the rollers 76 will be engaged by the socket member 98 in such a manner as to start the brackets 51 in their outward swinging movement far enough to position the associated rollers 76 against the gradually inclined surfaces of the template 71, and thus preclude any possibility of the machine becoming jambed by the engagement of the relatively slightly inclined portion of the edge of the template with the rollers 76.

It is to be understood that the details of the invention as herein disclosed, are subject to alteration within the spirit or scope of the appended claims.

I claim:

1. In a woodworking machine, a frame, means for advancing work thereupon, a cutter support mounted for movement across the line of advance of said work, a rotary cutter carried thereby, means for driving said cutter, means urging said cutter support inwards in respect to said line of advance, a template mounted on said frame for movement in parallelism with said work, means carried by said cutter support and engageable with said template to limit the inward movement of said support, yieldable means urging said template to retracted position, and releasable means for interlocking said template and work during advance of the work, said interlocking means becoming disengaged to permit return of the template at a predetermined time during the cycle of the machine.

2. A woodworking machine comprising a frame, means for advancing work thereupon, a bracket pivotally mounted upon said frame, means urging said bracket inwards in respect to the line of travel of said work, a rotary cutter and a driving motor therefor carried by said bracket, a template mounted on said frame for movement in parallelism with said line of travel, a roller carried by said bracket and engageable with said template to limit inward movement of the bracket, a movably mounted detent carried by said templet and adapted to extend into the line of travel of said work, means for retracting said detent upon completion of the stroke of the template, means urging said template to initial position, and means for returning said detent to extended position upon return of said template to retracted position.

3. A woodworking machine comprising a frame, means for advancing work thereupon, a bracket pivotally mounted upon said frame, means urging said bracket inwards in respect to the line of travel of said work, a rotary cutter and a driving motor therefor carried by said bracket, a template mounted on said frame for movement in parallelism with said line of travel, a roller carried by said bracket and engageable with said template to limit inward movement of the bracket, means urging said template to retracted position, a movable detent carried by said template, spring means urging said detent through a slot in the frame into the line of travel of the work, and a cam surface on said frame engageable with said detent to force it out of line of travel of the work upon completion of the stroke of the template.

4. A woodworking machine comprising a frame, means for advancing work thereupon, a bracket pivotally mounted upon said frame, means urging said bracket inwards in respect to the line of travel of said work, a rotary cutter carried by said bracket, a template slidably mounted on said frame, a roller carried by said bracket in engagement with said template to limit inward movement of the bracket, means for reciprocating said template in respect to the frame, said template at one extreme of its movement passing out of engagement with said roller, and means for moving said bracket outwards as said template returns.

5. A woodworking machine comprising a frame, means for advancing work thereupon, a bracket pivotally mounted upon said frame, means urging said bracket inwards in respect to the line of travel of said work, a rotary cutter carried by said bracket, a template slidably mounted on said frame, a roller carried by said bracket in engagement with said template to limit inward movement of the bracket, means for reciprocating said template in respect to the frame, said template at one extreme of its movement passing out of engagement with said roller, an arm pivoted adjacent said end of the template, a socket member carried thereby and engageable with said roller upon return movement of the template, and spring means normally retaining said arm in parallelism with the line of travel of the template.

6. In a woodworking machine, a frame, means for advancing work thereupon, adjustable cutting means engageable with said work during advance thereof, means holding said cutting means in predetermined position during a portion of said advance, and means carried by said holding means and engageable by said work at a predetermined time during the advance thereof, whereby the holding means is moved and the position of said cutting means varied with respect to the work.

7. In a woodworking machine, a frame, means for advancing work thereupon, adjustable cutters engageable with said work during advance thereof, means urging said cutters to the work, a template movably mounted on said frame and associated with said cutters to limit their movement toward the work, and a detent carried by said template and engageable by said work at a predetermined interval after being engaged by said cutters whereby the template is moved to vary the adjustment of said cutters with respect to the work.

In testimony whereof I have signed my name to this specification.

JAMES R. CAMERON.